US009232019B2

United States Patent
Caskey et al.

(10) Patent No.: US 9,232,019 B2
(45) Date of Patent: Jan. 5, 2016

(54) UNDOING SENT COMMUNICATIONS (71) Applicant: International Business Machines Corporation, Armonk, NY (US)

(72) Inventors: Sasha P. Caskey, New York, NY (US); Dimitri Kanevsky, Ossining, NY (US); Peter K. Malkin, Ardsley, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 13/963,660

(22) Filed: Aug. 9, 2013

(65) Prior Publication Data
US 2014/0297786 A1   Oct. 2, 2014

Related U.S. Application Data (63) Continuation of application No. 13/850,751, filed on Mar. 26, 2013.

(51) Int. Cl.
*G06F 15/16* (2006.01)
*H04L 29/08* (2006.01)
*H04L 12/58* (2006.01)

(52) U.S. Cl.
CPC .............. *H04L 67/306* (2013.01); *H04L 51/00* (2013.01)

(58) Field of Classification Search
None
See application file for complete search history.

(56) References Cited

U.S. PATENT DOCUMENTS

| | | | |
|---|---|---|---|
| 6,817,018 B1 * | 11/2004 | Clarke et al. ................. 719/313 |
| 7,113,767 B2 | 9/2006 | Väänänen | |
| 7,640,307 B2 | 12/2009 | Daniels et al. | |
| 8,073,122 B2 | 12/2011 | Kay et al. | |
| 2004/0148356 A1 | 7/2004 | Bishop, Jr. et al. | |
| 2009/0049134 A1 | 2/2009 | Kumhyr et al. | |
| 2010/0057869 A1 | 3/2010 | Stavrou et al. | |
| 2011/0047222 A1 * | 2/2011 | Farrell et al. ................. 709/206 |
| 2011/0131281 A1 | 6/2011 | Mishra et al. | |
| 2011/0191433 A1 * | 8/2011 | Du ................................. 709/206 |
| 2012/0110642 A1 | 5/2012 | Grassel et al. | |

(Continued)

FOREIGN PATENT DOCUMENTS

| | | |
|---|---|---|
| CN | 101931916 A | 12/2010 |
| TW | 201041370 A | 11/2010 |

OTHER PUBLICATIONS

IBM, "System for Managing or Modifying the Behaviour of Electronic Messages," ip.com, IPCOM000172105D, Jun. 2008, 2 pages.

(Continued)

*Primary Examiner* — Melvin H Pollack
*Assistant Examiner* — Oluwatosin Gidado
(74) *Attorney, Agent, or Firm* — Anne V. Dougherty; Ryan, Mason & Lewis, LLP (57) ABSTRACT

Techniques for managing objects sent in a communication system. For example, an apparatus for managing an object in a communication system is configured to identify an object previously sent in the communication system. A first target to which the object was sent is determined. A first agent is deployed to the first target. The first agent is configured to undo the previously sent object at the first target, and determine if the previously sent object was sent from the first target to a second target. When the previously sent object was sent from the first target to the second target, the apparatus deploys a second agent to the second target to undo the previously sent object at the second target.

20 Claims, 6 Drawing Sheets

(56) References Cited

U.S. PATENT DOCUMENTS

| | | |
|---|---|---|
| 2012/0158880 A1 | 6/2012 | Barman et al. |
| 2012/0198233 A1 | 8/2012 | George et al. |
| 2013/0061128 A1* | 3/2013 | Lucco et al. ............... 715/234 |

OTHER PUBLICATIONS

Disclosed Anonymously, "Method and System for Managing Inadvertently Sent Messages," ip.com, IPCOM000207843D, Jun. 2011, 4 pages.

* cited by examiner

FIG. 8

UNDOING SENT COMMUNICATIONS

CROSS-REFERENCE TO RELATED APPLICATION(S)

This application is a Continuation of pending U.S. application Ser. No. 13/850,751 filed on Mar. 26, 2013, the disclosure of which is incorporated herein by reference.

FIELD

The present application relates to communication systems and, more particularly, to techniques for managing objects sent in such communication systems.

BACKGROUND

As is well known, exchanging electronic messages such as emails or texts over a communication system has become a preferred mode of communication for individuals in both business and social settings. However, sometimes people send messages and afterwards, for whatever reason, wish they had not sent the message (e.g., the message was sent mistakenly, impulsively, etc.). Some communication systems allow a sender to recall a sent message. For example, the Google® (Mountain View, Calif.) email system known as Gmail® allows a user to recall a sent message within a predetermined time period, e.g., five seconds, if the user configured his/her email settings to do so. But this does not solve the problem when the predetermined time period has passed, and particularly when the sent message has already been received by a recipient of the message. The Microsoft® (Redmond, Wash.) email system known as Outlook® also allows recall of a sent message, however, only if the message has not yet been read by a recipient.

Once a message is received at a destination, recipients can copy, print and forward the message. Some communication systems allow a sender to configure a message as one which cannot be copied or printed. As such, a recipient who receives the message can only read the message but cannot perform standard operations such as copying, forwarding or printing.

Some communication systems provide security and privacy control for received messages whereby only an authorized or authenticated user is able to access the message. Authorization or authentication may be provided, for example, by automatic methodologies in combination with biometric sensors (e.g., user identification via face recognition) whereby a message is deleted if an attempt to view it is being made by an unauthorized or unauthenticated person. But this still does not resolve the problem of preventing the processing of a message, that the sender wishes had not been sent, by an authorized or authenticated recipient.

SUMMARY

Embodiments of the invention provide techniques for managing objects sent in a communication system.

For example, in one embodiment, a method for managing an object in a communication system comprises the following steps. An object previously sent in the communication system is identified. A first target to which the object was sent is determined. A first agent is deployed to the first target. The first agent is configured to undo the previously sent object at the first target, and determine if the previously sent object was sent from the first target to a second target. When the previously sent object was sent from the first target to the second target, the method deploys a second agent to the second target to undo the previously sent object at the second target.

In another embodiment, a method for managing an object in a communication system comprises the following steps. An object created with a first application program previously sent in the communication system is identified. A first target to which the object was sent is determined. The first target has a second application program for managing objects which is different from the first application program. A first agent is deployed to the first target. The first agent is configured to interact with the first application program and the second application program, and undo the previously sent object at the first target.

These and other objects, features, and advantages of the present invention will become apparent from the following detailed description of illustrative embodiments thereof, which is to be read in connection with the accompanying drawings.

DETAILED DESCRIPTION

Embodiments of the invention will be described below in the context of an email communication system. However, it is to be understood that the communication undoing techniques described herein are not limited to this specific type of communication system but are more generally applicable to any communication system in which it would be desirable to undo messages and other objects.

As used illustratively herein, the term "object" refers to any data item or set of data items that may be sent in a communication system. An object may take on any form and it is to be understood that the invention is not limited to any particular form. For example, an object may be electronic data such as an electronic mail (email) message, a text message, a text-based message, a short message service (SMS) message, a Tweet® (Twitter® Inc. of San Francisco, Calif.), a really simple syndication (RSS) feed, a web page, a document, a data file, an image, an audio file, a video, an attachment, or any other type of data set, data item, or data unit, as well as combinations thereof (e.g., a multimedia object, an email with one or more attachments, etc.). Furthermore, an object may be referred to herein as a "communication" or a "message." Thus, embodiments of the invention are not limited to any particular type of object, communication or message.

As further used illustratively herein, the term "undo" or "undoing," with respect to an object (or communication or message) refers to: deleting, removing, recalling, or otherwise destroying the object; tracking, determining, identifying or otherwise monitoring at least one action that can be performed on the object; and/or preventing, blocking, reversing or otherwise restricting at least one action that can be performed on the object.

Also, as used illustratively herein, the term "user" refers to a person or group of people, one or more devices (device(s)) or one or more other systems (system(s)), a person or group utilizing or otherwise associated with the device(s) or other system(s), or a combination of both the person or group and the device(s) or other system(s).

As will be described herein, embodiments of the invention provide techniques for managing objects sent in a communication system that the sender did not intend to send or, in retrospect, wishes were not sent. Furthermore, the techniques prevent or at least reduce the likelihood that such an object is passed on further in the communication system to other targets (e.g., users, systems, devices, destinations, etc.).

Figure 1:
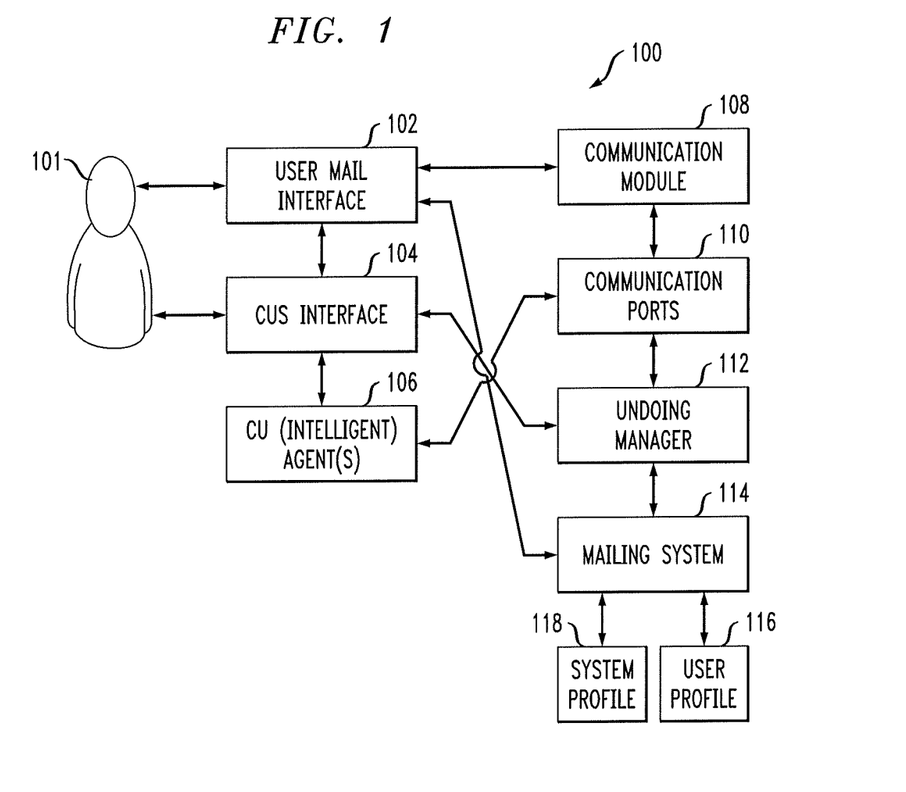
FIG. 1 illustrates a communication undoing system, according to an embodiment of the invention.

FIG. 1 illustrates a communication undoing system, according to an embodiment of the invention. The communication undoing system (CUS) 100 includes a user mail interface 102, a CUS interface 104, one or more communication undoing (CU) agents 106 (also referred to as "intelligent agents"), a communication module 104, one or more communication ports 110, an undoing manager 112, a mailing system 114, a user profile 116, and a system profile 118.

In an illustrative embodiment, the components of system 100 may be part of a user's personal computer, laptop or other communication-enabled device (e.g., smartphone, tablet, personal digital assistant, etc.) that has an email and/or text messaging software system (application program) installed thereon. It is assumed that the system 100 is connected to a communication system with one or more other communication-enabled devices of other users. An example processing platform upon which the network of systems and devices can be implemented on will be further described below in the context of FIG. 8.

Thus, the user mail interface 102 is a user interface that allows a user 101 to create, edit, send, receive, and read messages (i.e., objects) in a typical manner (e.g., including a message inbox, a message outbox, deleted messages, draft messages, etc.). The user mail interface 102 provides the user 100 with an access point to the mailing system 114. The mailing system 114 is the overall software system that handles the creation, editing, sending, receiving, and reading of messages, as well as manages at least a portion of the one or more communication ports 110 and the communication module 108 through which messages are sent and received. It is to be understood that such communication ports and communication modules can refer to communication path elements at the message sender, the message recipient(s), at one or more communication nodes in between, or some combination thereof. Operations and functions of the mailing system are defined by the system profile 118, while user preferences regarding the system, as well as user preferences and parameters of communication undoing operations to be described below, are defined by the user profile 116.

The CUS interface 104 is a user interface (e.g., graphical user interface) that allows the user 101 to control communication undoing operations performed by the system 100. It is through the CUS interface 104 that the user 101 is able to set preferences and other parameters associated with the communication undoing operations of the system 100. As mentioned, such preferences and other parameters are stored in the user profile 116. The CUS interface 104 also allows the user to identify the messages or parts thereof that he/she wishes to undo.

Figure 2:
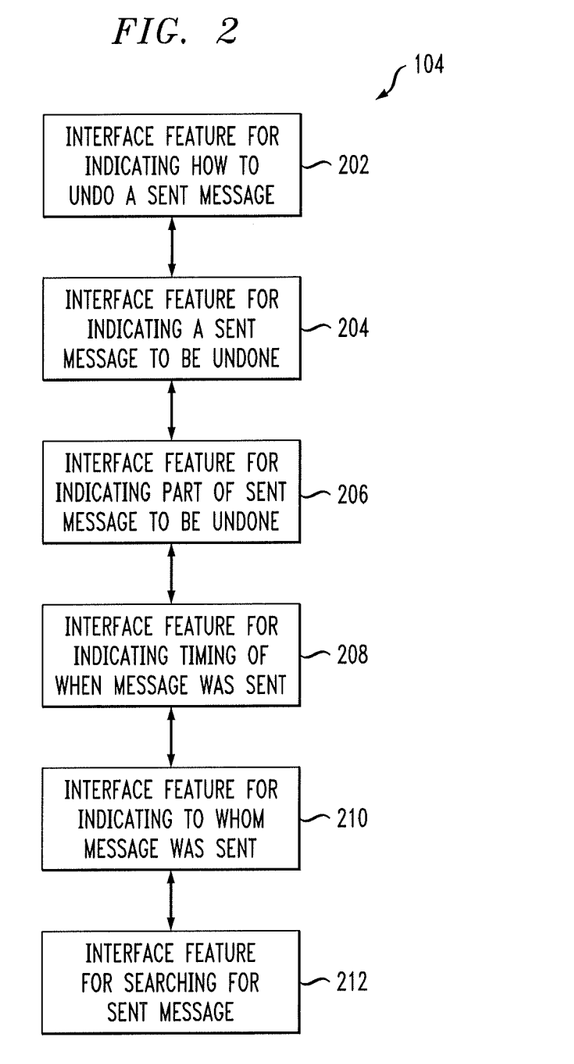
FIG. 2 illustrates an interface of the communication undoing system of FIG. 1.

By way of example, FIG. 2 illustrates interface features with which the CUS interface 104 is configured. As shown, the CUS interface 104 includes interface features 202 through 212. While certain features are shown in the illustrative embodiment of FIG. 2, it is to be understood that the CUS interface 104 can have more or less features (than those shown) in alternative embodiments.

Thus, interface feature 202 enables the user 101 to indicate how to undo a message sent by the mailing system 114 (e.g., what undoing operation to use). Interface feature 204 enables the user 101 to indicate (e.g., identify, mark, or otherwise specify) a sent message to be undone. Further, interface feature 206 enables the user 101 to indicate a portion or a part of a message to be undone. Interface feature 208 enables the user 101 to indicate temporal criteria (e.g., timing such as time and/or date) associated with when a message sought to be undone was sent. The feature 208 can also provide a user with timing information on when the message was received at one or more destinations. Still further, interface feature 210 enables the user 101 to indicate to whom (e.g., destination, target, recipient, etc.) a message sought to be undone was sent. The interface feature 212 enables the user 101 to search for a sent message. Note that the messages, destinations, send time/date, and other information are obtained from the mailing system 114 which, as mentioned above, manages the typical mail create, edit, send, receive and read operations of the system 100.

In the embodiment of FIG. 2, the system 100 deploys one or more CU agents (intelligent agents) 106, under control of the undoing manager 112, to undo a previously sent message (identified by the user 101 through the CUS interface 104) at its initial destination (first target) in the communication system. The one or more CU agents 106 are also configured to determine if the previously sent message was sent from the initial destination to one or more other destinations in the communication system. When the previously sent message was sent from the initial destination to one or more other destinations, one or more other CU agents are deployed (either from the system 100 or from the one or more CU agents 106 at the initial destination) to the one or more other destinations to undo the previously sent message at the one or more other destinations.

In one embodiment, a CU agent is a set of program code or software instructions that is executed at the various destinations to which it is deployed to perform the various communication undoing operations described herein. In one embodiment, a CU agent is assigned a higher speed priority for traversing the communication system than the messages that traverse the communication system. Such a speed priority assignment may be implemented by the infrastructure provider of the communication system.

Figure 3:
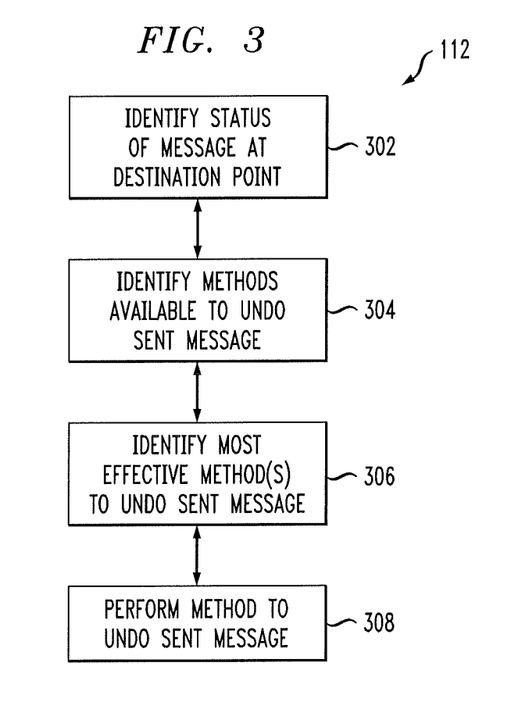
FIG. 3 illustrates a methodology for use in undoing communications according to an embodiment of the invention.

FIG. 3 illustrates steps performed by the undoing manager 112. It is to be appreciated that the undoing manager 112 can perform less or more steps than those expressly shown in FIG. 3. In step 302, the undoing manager 112 identifies the status of a message that the user 101 has identified as a message to be undone. This may be done by the undoing manager 112 sending a query to one or more CU agents 106 deployed at the destination of the sent message, and/or by the undoing manager 112 consulting the mailing system 114 to see if the message has been received or read. In either case, the undoing manager 112 uses this information to determine the status of the sent message.

In step 304, the undoing manager 112 identifies methods available to undo the sent message. The methods available may be set by the user (as specified in the user profile 116) or determined ad hoc or on the fly by the system depending on the context of the message environment. The undoing manager 112, in step 306, identifies the most effective method or methods (from the available methods) to use to undo the sent message. In step 308, the undoing manager 112 performs the method or methods selected in step 306 to undo the sent message.

Also, the undoing manager 112 may consult a profile (e.g., stored in system profile 118) associated with one or more of the message destinations to determine one or more permissible actions that can be taken by the one or more CU agents on the sent message.

Figure 4:
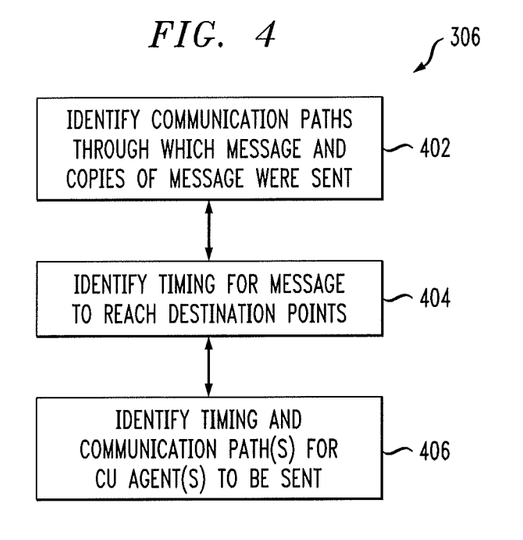
FIG. 4 illustrates a methodology for use in undoing communications according to another embodiment of the invention.

FIG. 4 illustrates an example of step 306 performed by the undoing manager 112. As shown in step 402, the undoing manager 112 identifies communication paths through which the message to be undone was sent. If the message was copied at the destination and sent on to other destinations, these communication paths are identified as well. That is, the undoing manager 112 can determine the communication ports 110 and communication module 108 through which the message was sent. Note that one or more CU agents 106 (and/or other system elements not expressly shown) can inform the undoing manager 112 about the communication ports and modules of the one or more destinations through which the message passed.

In step 404, the undoing manager 112 identifies temporal criteria associated with the sent message. This can include, but is not limited to, the time/date the message was sent from the system 100 and the time/date the message was received at the destination. In this manner, a communication system traversal time can be computed (e.g., the difference between the time the message is sent and the time it is received).

In step 406, the undoing manager 112 identifies the timing and communication paths for sending out one or more CU agents to undo the sent message. The timing and communication paths determined in step 406 are based on at least the information the undoing manger 112 obtained in steps 402 and/or 404. Steps 402 through 406 thus enable the undoing manager 112 to identify the most effective method or methods (from the available methods) to use to undo the sent message.

Figure 5:
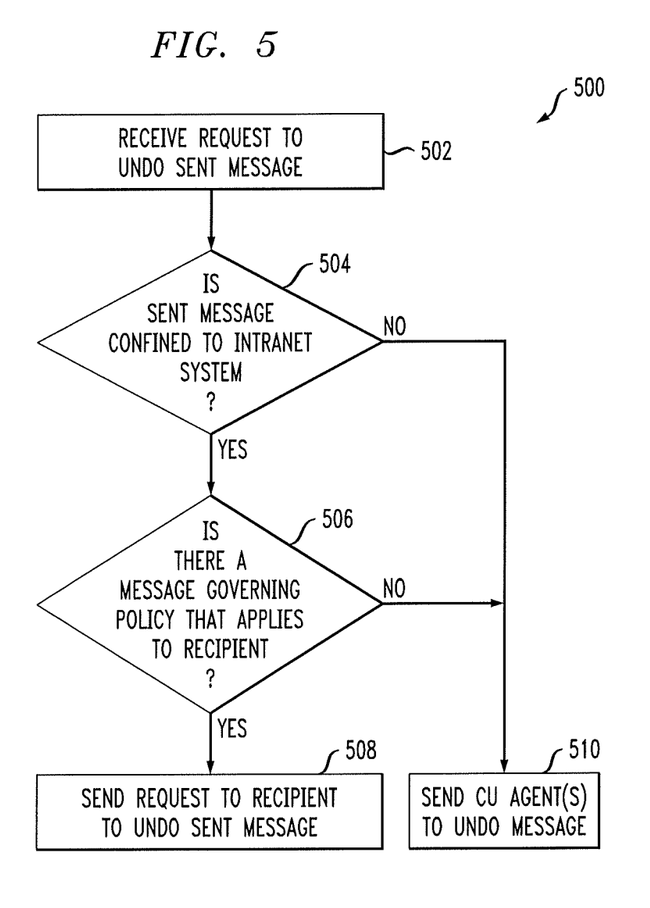
FIG. 5 illustrates a methodology for use in undoing communications according to yet another embodiment of the invention.

FIG. 5 illustrates a methodology for use in undoing communications according to an embodiment of the invention. It is to be appreciated that the methodology 500 shown in FIG. 5 can be executed in accordance with system 100.

As shown, in step 502, a request is received to undo a sent message. In step 504, a check is made to determine if the sent message is confined to an intranet system. By "intranet system," it is meant that the message may have been sent within a communication system internal to an enterprise, company or organization with which the user 101 is affiliated, as opposed to an external communication system such as the Internet or World Wide Web. As such, in step 506, if the message is confined to an intranet system, a check is made to determine if a message governing policy applies to the recipient. For example, the recipient (and other users) in the intranet system may be obliged or otherwise inclined to adhere to a message governing policy. If so, in step 508, a request is sent to the recipient to undo the sent message.

However, if the sent message is not confined to an intranet system (step 504), or if confined to an intranet system but the recipient is not obligated to follow a message governing policy (506), then one or more CU agents are sent in step 510 to the recipient's device to undo the message.

Figure 6:
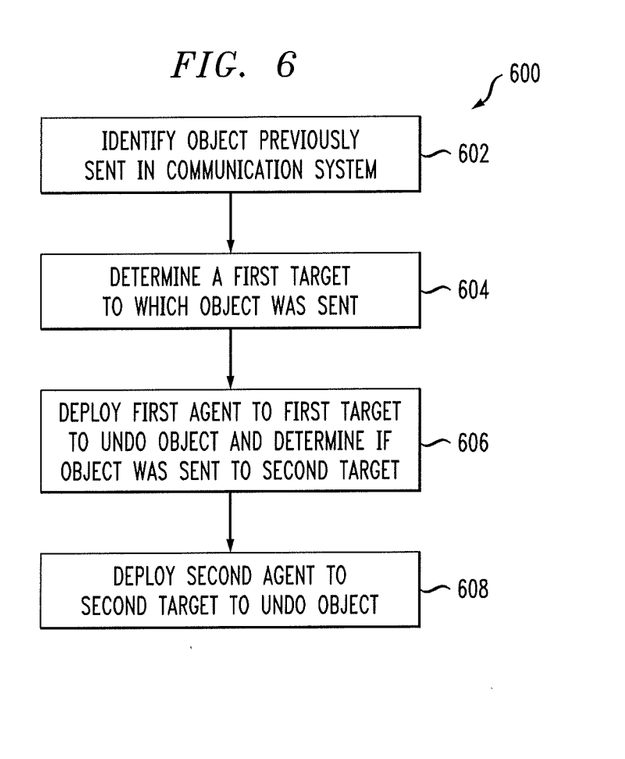
FIG. 6 illustrates a methodology for use in undoing communications according to a further embodiment of the invention.

FIG. 6 illustrates a methodology for use in undoing communications according to another embodiment of the invention. Again, it is to be appreciated that the methodology 600 shown in FIG. 6 can be executed in accordance with system 100.

As shown in step 602, an object (e.g., communication or message) previously sent in the communication system is identified. In step 604, a first target (e.g., destination, recipient, etc.) to which the object was sent is determined. A first agent (e.g., CU agent 106) is deployed to the first target in step 606. The first agent is configured to undo the previously sent object at the first target, and determine if the previously sent object was sent from the first target to a second target (e.g., destination, recipient, etc.). When the previously sent object was sent from the first target to the second target, a second agent (e.g., CU agent 106) is deployed to the second target, in step 608, to undo the previously sent object at the second target. It is to be understood that this set of steps (or a subset thereof) can be repeated and thus propagated throughout the communication system, i.e., another agent can be sent to a third target to undo the message and copies thereof, and so on, when the object is sent to the third target and beyond.

Figure 7:
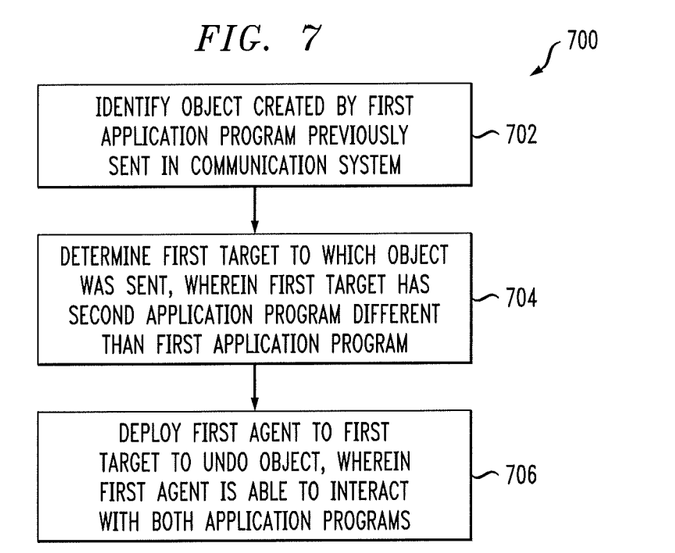
FIG. 7 illustrates a methodology for use in undoing communications according to yet a further embodiment of the invention.

FIG. 7 illustrates a methodology for use in undoing communications according to yet another embodiment of the invention. Again, it is to be appreciated that the methodology 700 shown in FIG. 7 can be executed in accordance with system 100.

As shown in step 702, an object (e.g., communication or message) created with a first application program and previously sent in the communication system is identified. By way of example only, the first application program can be a first type of email system (e.g., Gmail® system from Google® of Mountain View, Calif.). In step 704, a first target (e.g., destination, recipient, etc.) to which the object was sent is determined. It is assumed that the first target has a second application program for managing objects which is different from the first application program. By way of example only, the second application program can be a second type of email system (e.g., Outlook® system from Microsoft® of Redmond, Wash.). A first agent (e.g., CU agent) is deployed to the first target in step 706. The first agent is configured to interact with the first application program and the second application program, and undo the previously sent object at the first target. Thus, advantageously, the agent is configured to take action on a message in one type of email system even if the message was created in a different type of email system.

Given the illustrative implementations above, consider the following illustrative use case that may be realized via the communication undoing techniques and systems described herein.

Step 1: Assume a user informs the communication undoing system (e.g., system 100) that the sending of some communication message should be undone at least as much as possible. The user indicates the communication message X (e.g., via CUS interface 104) that he/she wishes to have undone by: (1) pointing a cursor on a sent mail in a sent directory and selecting the sent mail; (2) pasting a part of the message in a messenger of a sent window; and/or (3) indicating the timing when a message was sent.

Step 2: The communication undoing system finds a communication port where the communication message X was sent and sends one or more CU agents to this communication port. The one or more CU agents, after arriving to this communication port, perform the following operations:

a) identify location Y of the sent message X (this location could be a computer, laptop, cell phone or other communication devices); and b) identify a history of actions associated with the message X after receipt at location Y; for example: (i) the message X was forwarded by the user at location Y to one or more other locations; (ii) the message X was downgraded and saved in some directory; and/or (iii) the message X is displayed on the user's monitor.

Step 3: The one or more CU agents then perform the following actions:

a) If the configuration at the location Y allows, the one or more CU agents destroy the message X;

b) If the message X was sent to new locations from Y then one or more CU agents are sent to the new locations; and c) If the message X cannot be destroyed, then the one or more CU agents restrict operations that could be performed with the message X, for example, but not limited to, forwarding, copying, saving, printing, etc.

The one or more CU agents can also be sent to communications ports that are connected with the original communication port with a command to block and destroy the message X if it is sent from the location Y.

In addition to the above functions, as mentioned above, the one or more CU agents can have higher priorities when they move in the communication system and can arrive at destination points faster than original messages. This allows, in some cases, a CU agent that arrives at a destination point earlier than the original message to block receipt of the original message.

Figure 8:
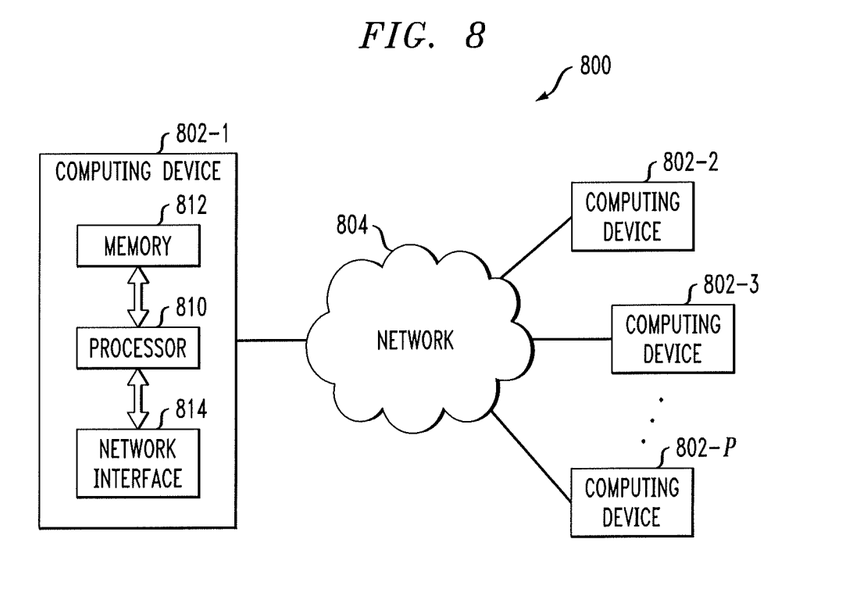
FIG. 8 illustrates a processing platform in accordance with which one or more components/steps of a communication undoing system are implemented, according to an embodiment of the invention.

FIG. 8 illustrates a processing platform in accordance with which one or more components/steps of a communication undoing system are implemented, according to an embodiment of the invention.

An example of a processing platform on which the communication undoing system 100 of FIG. 1 may be implemented is information processing platform 800 shown in FIG. 8. The processing platform 800 in this embodiment comprises at least a portion of the system 100 and includes a plurality of computing devices, denoted 802-1, 802-2, 802-3, ... 802-P, which communicate with one another over a network 804. One or more of the elements of system 100 may therefore each run on a computing device, client device, server, computer or other processing platform element, which may be viewed as an example of what is more generally referred to herein as a "processing device." As illustrated in FIG. 8, such a device generally comprises at least one processor and an associated memory, and implements one or more functional modules for controlling certain features of system 100. Multiple elements or modules may be implemented by a single processing device in a given embodiment.

The computing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. The memory 812 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the computing device 802-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the computing device 802-1 is network interface circuitry 814, which is used to interface the computing device with the network 804 and other system components. Such circuitry may comprise conventional transceivers of a type well known in the art.

The other computing devices 802 of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 800. Such components can communicate with other elements of the system 800 over any type of network, such as a wide area network (WAN), a local area network (LAN), a satellite network, a telephone or cable network, or various portions or combinations of these and other types of networks.

As will be appreciated by one skilled in the art, embodiments of the invention may be embodied as a system, apparatus, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 8, the diagrams in the figures illustrate the architecture, functionality, and operation of possible implementations of systems, methods and computer program products according to various embodiments of the invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-8, can also include, as described herein, providing a system, wherein the system includes distinct modules (e.g., modules comprising software, hardware or software and hardware). By way of example only, the modules may include but are not limited to the language model conversion module. These and other modules may be configured, for example, to perform the steps described and illustrated in the context of FIGS. 1-8.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for managing an object in a communication system, comprising:
   a memory; and
   a processor coupled to the memory and configured to:
   identify an object previously sent in the communication system;
   determine a first target to which the object was sent;
   deploy a first agent to the first target, the first agent being configured to: undo the previously sent object at the first target; and determine if the previously sent object was sent from the first target to a second target; and
   when the previously sent object was sent from the first target to the second target, deploy a second agent to the second target configured to undo the previously sent object at the second target;
   wherein the respective agent is configured to undo the previously sent object by: destroying the object at the respective target; and when the object cannot be destroyed, at least one of monitoring and restricting one or more actions that can be performed on the object at the respective target.

2. The apparatus of claim 1, wherein the identified object comprises one of an electronic mail message, a text message, an image and a multimedia object.

3. The apparatus of claim 1, wherein the processor is further configured to identify by selecting the object from objects listed in a sent directory.

4. The apparatus of claim 1, wherein the processor is further configured to identify an object by:
   specifying a temporal criterion associated with the sending of one or more objects; and
   determining whether the object was sent during the specified temporal criterion.

5. The apparatus of claim 1, wherein the processor is further configured to deploy the first agent to the first target further comprising the first agent being configured to: determine if the object was copied into another object; and when the object was copied into the other object, undo the other object.

6. The apparatus of claim 1, wherein the one or more actions comprise at least one of forwarding the object, copying the object and printing the object.

7. The apparatus of claim 1, wherein the processor has access to the application program that sent the object.

8. The apparatus of claim 1, wherein the first target and the second target comprise the same type of application program executing on different computing devices.

9. The apparatus of claim 1, wherein the first target and the second target comprise different types of application programs.

10. The apparatus of claim 1, wherein the processor is further configured to deploy one or more additional targets for which it is determined that the object was sent.

11. The apparatus of claim 1, wherein the first agent and the second agent are assigned a higher speed priority for traversing the communication system than the object.

12. The apparatus of claim 1, wherein the processor is further configured to obtain a profile associated with at least one of the first target and the second target to determine one or more permissible actions that can be taken by at least one of the first agent and the second agent on the object.

13. A computer program product comprising a non-transitory processor-readable storage medium having encoded therein executable code of one or more software programs, wherein the one or more software programs when executed by the at least one processor implement the steps of:
   identifying an object previously sent in the communication system;
   determining a first target to which the object was sent;
   deploying a first agent to the first target, the first agent being configured to: undo the previously sent object at the first target; and determine if the previously sent object was sent from the first target to a second target; and
   when the previously sent object was sent from the first target to the second target, deploying a second agent to the second target configured to undo the previously sent object at the second target;
   wherein the respective agent is configured to undo the previously sent object by: destroying the object at the respective target; and when the object cannot be destroyed, at least one of monitoring and restricting one or more actions that can be performed on the object at the respective target.

14. An apparatus for managing an object in a communication system, comprising:
   a memory; and
   a processor coupled to the memory and configured to:
   identify an object created with a first application program previously sent in the communication system;
   determine a first target to which the object was sent, wherein the first target has a second application program for managing objects which is different from the first application program; and
   deploy a first agent to the first target, the first agent being configured to: undo the previously sent object at the first target; and determine if the previously sent object was sent from the first target to a second target;
   wherein the first agent is configured to undo the previously sent object by: destroying the object at the first target; and when the object cannot be destroyed, at least one of monitoring and restricting one or more actions that can be performed on the object at the first target.

15. The apparatus of claim 14, wherein the processor is further configured to deploy the first agent to the first target further comprising:
   the first agent being configured to determine if the previously sent object was sent from the first target to a second target; and
   when the previously sent object was sent from the first target to the second target, deploying a second agent to the second target to undo the previously sent object at the second target.

16. The apparatus of claim 14, wherein the one or more actions comprise at least one of forwarding the object, copying the object and printing the object.

17. A computer program product comprising a non-transitory processor-readable storage medium having encoded therein executable code of one or more software programs, wherein the one or more software programs when executed by the at least one processor implement the steps of:
   identifying an object created with a first application program previously sent in the communication system;
   determining a first target to which the object was sent, wherein the first target has a second application program for managing objects which is different from the first application program; and
   deploying a first agent to the first target, the first agent being configured to: interact with the first application program and the second application program; and undo the previously sent object at the first target;
   wherein the first agent is configured to undo the previously sent object by: destroying the object at the first target; and when the object cannot be destroyed, at least one of monitoring and restricting one or more actions that can be performed on the object at the first target.

18. The method of claim 1, wherein the respective agent is further configured to identify a history of actions associated with the object after receipt at the respective target.

19. The method of claim 18, further comprising determining at least one action to be performed on the object based on the identified history of actions.

20. The method of claim 11, wherein the higher speed priority assigned to the first agent and the second agent is selected so as to allow for the first and second agents to arrive at the respective targets before the object.

* * * * *